(12) United States Patent
Sandham et al.

(10) Patent No.: US 7,793,270 B2
(45) Date of Patent: Sep. 7, 2010

(54) METHOD AND APPARATUS FOR PERFORMING INCREMENTAL VALIDATION OF PROGRAM CODE CONVERSION

(75) Inventors: John H. Sandham, Manchester (GB); Paul T. Knowles, Manchester (GB)

(73) Assignee: International Business Machines Corporation, Armonk, NY (US)

( * ) Notice: Subject to any disclaimer, the term of this patent is extended or adjusted under 35 U.S.C. 154(b) by 847 days.

(21) Appl. No.: 10/700,224

(22) Filed: Nov. 3, 2003

(65) Prior Publication Data

US 2004/0221273 A1 Nov. 4, 2004

(51) Int. Cl.
  *G06F 9/44* (2006.01)
  *G06F 9/45* (2006.01)
(52) U.S. Cl. .................................. 717/134; 717/138
(58) Field of Classification Search ......... 717/134–139, 717/124
  See application file for complete search history.

(56) References Cited

U.S. PATENT DOCUMENTS

| | | | |
|---|---|---|---|
| 4,590,549 A | 5/1986 | Burrage et al. |
| 5,138,708 A | 8/1992 | Vosbury |
| 5,729,554 A | 3/1998 | Weir et al. |
| 5,905,855 A | 5/1999 | Klaiber et al. |
| 5,995,993 A | 11/1999 | Liang et al. |
| 6,415,436 B1 | 7/2002 | Patel |
| 2002/0007254 A1 | 1/2002 | Takeda et al. |

OTHER PUBLICATIONS

Barrio, "Study of the techniques for emulation programming", The Technical University of Catalonia (UPC), Europe, pp. 1-152, Jun. 2001.*
Johansson et al., "A High Performance Erlang System", ACM, pp. 32-43, 2000.*
Berger, "Co-Verification Handles More Complex Embedded Systems", Electronic Desigh, 45(20):96, 98, 100, 102 (1997).
Narushima, et al., "H Series System Development Support Tools", Hitachi Review, 38(1):67-72 (1989).
International Search Report issued for PCT/GB03/04727, dated May 25, 2004.

* cited by examiner

*Primary Examiner*—Ted T Vo
(74) *Attorney, Agent, or Firm*—Matthew B. Talpis; Gregory K Goshorn; Greg Goshorn, P.C.

(57) ABSTRACT

A method and apparatus for verifying program code conversion performed by an emulator. A first emulator configured in a same-to-same (X-X) mode converts subject code into target code for execution by a subject processor. Execution of the subject code natively by the subject processor is compared against execution through the first emulator, to verify that program code conversion. Optionally, the first emulator is then used to incrementally validate program code conversion (i.e. optimisation and/or translation) performed by a second emulator, such as a this-to-that (X-Y) mode emulator running on a target processor.

27 Claims, 11 Drawing Sheets

METHOD AND APPARATUS FOR PERFORMING INCREMENTAL VALIDATION OF PROGRAM CODE CONVERSION

BACKGROUND

1. Technical Field

The present invention relates in general to the field of program code conversion. In particular, the invention relates to a method and apparatus for verifying that program code conversion is performed correctly.

2. Description of Related Art

In the field of computer processing, a subject program is written to execute on a subject computer processor. Often it is necessary to perform program code conversion in order to convert the subject program into a different form. Firstly, it is sometimes desired to perform program code conversion in order to optimise execution of the subject program, such as by removing unnecessary instructions or by simplifying an instruction sequence. Secondly, it is sometimes desired to run the subject program on a target processor that is not compatible with the subject program. In either case, an emulator is used to perform the program code conversion, such that a converted program is produced in the desired different form.

There exists a strong desire to verify that the program code conversion is performed correctly. In particular, it is desired to verify that an outcome of running the converted program is equivalent to an outcome of running the original subject program. Ideally, it is desired to demonstrate bitwise compatibility between the subject program and the converted program.

SUMMARY

The following is a summary of various aspects and advantages realizable according to various embodiments according to the invention. It is provided as an introduction to assist those skilled in the art to more rapidly assimilate the detailed design discussion that ensues and does not and is not intended in any way to limit the scope of the claims that are appended hereto.

The present invention provides a method and apparatus for verifying program code conversion in a quick, efficient, accurate and cost-effective manner.

According to a first aspect of the present invention, there is provided a method of verifying program code conversion performed by an emulator by comparing execution of subject code natively on a subject processor against execution of the subject code on the subject processor through the emulator. Program code conversion is verified by comparing an emulated state of the subject code executed on the subject processor through the emulator with a native state of the subject code executed natively on the subject processor, such that the emulated state and the native state are compared at every available comparison point in the subject code. Program code conversion is preferably verified in verification modes of a varying degree of complexity such that increasingly complex verification modes are employed in turn.

Preferably, the method of verifying program code conversion selectively inhibits access to a memory associated with the subject processor by buffering load and store requests from the subject processor to the memory in a load/store buffer, and preferably selectively inhibits access to the memory when executing the target code, such that an emulated memory image is provided in the load/store buffer. The emulated memory image provided in the load/store buffer is then compared with subject processor state provided in the memory in order to perform the program code conversion verification.

In a particularly preferred development of the present invention, the program code conversion verification method may further include an incremental validation algorithm which compares the step of comparing execution of the subject code through the first emulator running on the subject processor against execution of the subject code through a second emulator running on a target processor. In employing the incremental validation algorithm, Preferably, the method comprises providing a first host processor is provided as the subject processor, and providing a second host processor is provided as the target processor, wherein the subject code is natively executable on the subject processor whilst not being natively executable on the target processor. Hence, in this case the subject processor and the target processor are inherently incompatible. After program code conversion of the first emulator on the subject processor is initially verified by According to a third aspect of the present invention there is provided a method of verifying program code conversion, comprising the step of: comparing execution of subject code through a first emulator running on a subject processor against execution of the subject code through a second emulator running on a target processor. According to a fourth aspect of the present invention there is provided a method of verifying program code conversion, comprising the steps of: comparing execution of subject code natively on a subject processor against execution of the subject code on the subject processor through a first emulator, thereby verifying program code conversion performed by the first emulator, and comparing execution then execution of subject code through the first emulator running on the subject processor is compared against execution of the subject code through a second emulator running on a target processor, thereby incrementally verifying program code conversion performed by the second emulator.

BRIEF DESCRIPTION OF THE DRAWINGS

For a better understanding of the invention, and to show how embodiments of the same may be carried into effect, reference will now be made, by way of example, to the accompanying drawings in which.

DETAILED DESCRIPTION

Figure 1:
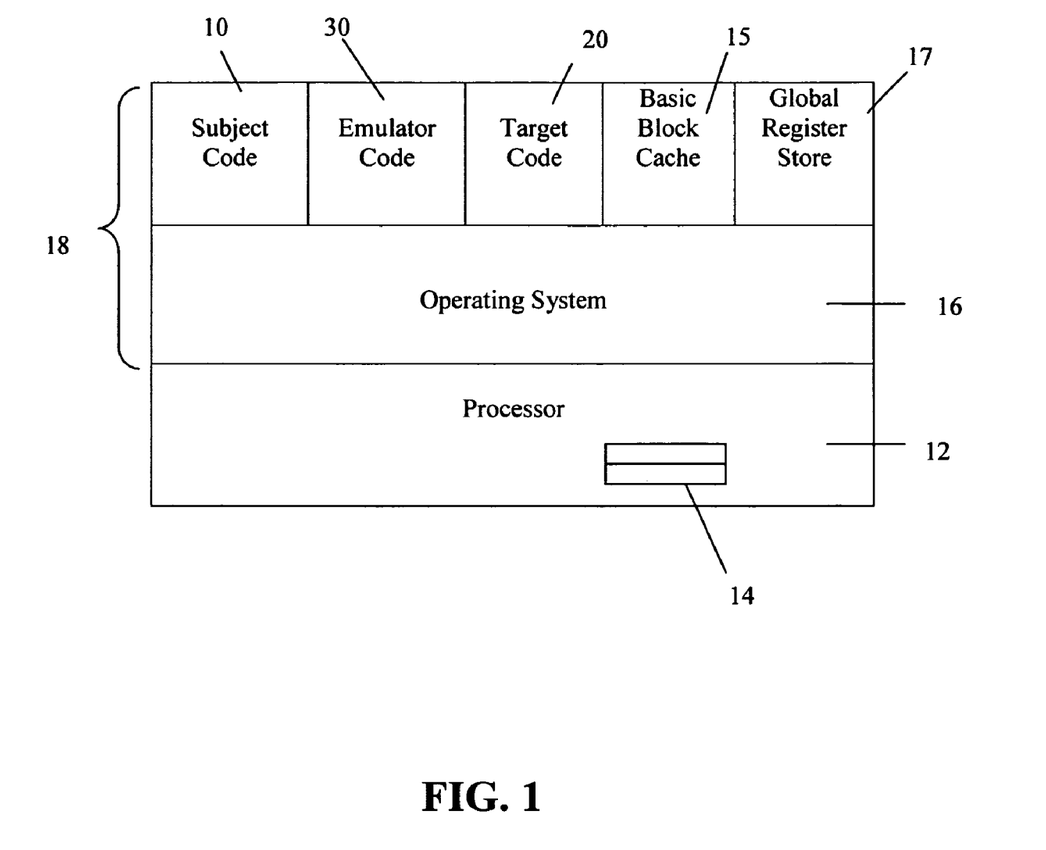
FIG. 1 is a schematic diagram of an illustrative computing environment for performing emulation in accordance with the present invention.

An illustrative apparatus for implementing various novel features discussed below is shown in FIG. 1. FIG. 1 illustrates a host processor 12 including registers 14 together with memory 18 storing a number of software components 10, 16, 20, and 30, where such memory 18 further provides a working storage for a basic block cache 15 and a global register store 17. The software components include an operating system 16, the emulator code 30, and translated target code 20. The emulator code 30 may function, for example, as an emulator translating subject code of one ISA into target code of another ISA or as an accelerator for translating subject code into translated code, each of the same ISA or as any other known type of emulator.

The emulator 30, i.e., the compiled version of the source code implementing the emulator functionality, and the target code 20, i.e., the translation of the subject code 10 produced by the emulator 30, run in conjunction with the operating system 16 such as, for example, UNIX running on the host processor 12, typically a microprocessor or other suitable computer. It will be appreciated that the structure illustrated in FIG. 1 is exemplary only and that, for example, software, methods and processes according to the invention may be implemented in code residing within or beneath an operating system. The subject code 10, emulator code 30, operating system 16, and memory storage mechanisms may be any of a wide variety of types, as known to those skilled in the art.

Figure 2:
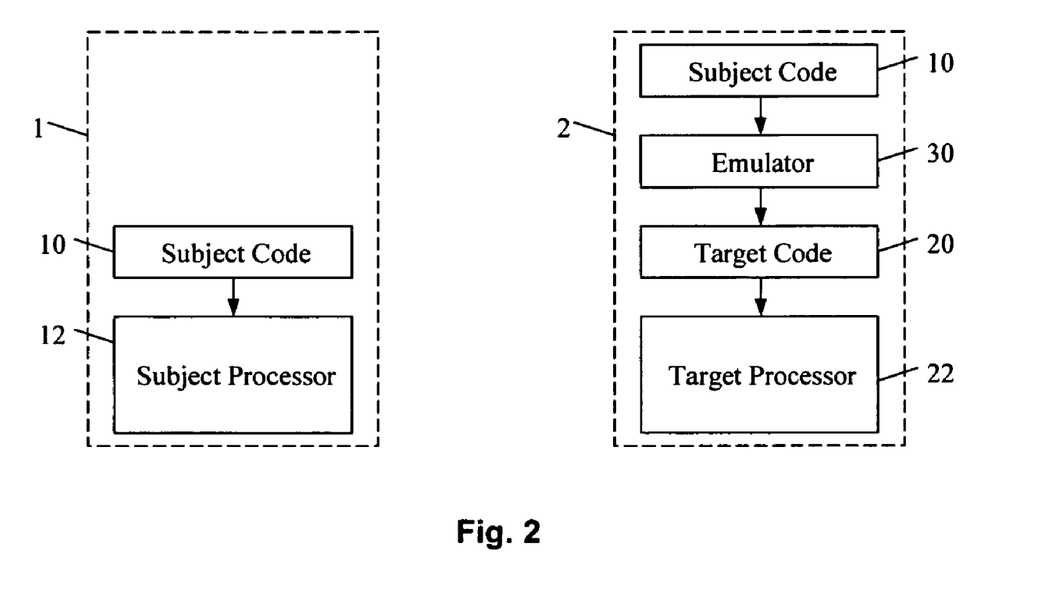
FIG. 2 is a schematic overview of an example computing system that involves program code conversion.

FIG. 2 shows an overview of an example computing system that employs program code conversion. The system includes a subject computing environment 1 and a target computing environment 2. The subject and target computing environments 1, 2 are typically provided by two physically separate computing platforms and hence FIG. 2 illustrates a cross-platform system. A subject program in the form of subject code 10 is executable on a subject processor 12 in the subject environment 1. For many practical reasons, such as to avoid laborious and time-consuming re-writing of existing programs, it is also desired to run the same subject code 10 on a target processor 22 in the target computing environment 2. However, it often occurs that the target processor 22 is not compatible with the subject code 10. Hence, an emulator 30 is provided in the target computing environment 2 to perform program code conversion. In this case, the emulator 30 performs a cross-platform translation to produce a converted program in the form of translated target code 20 that runs natively on the target processor 22.

The emulator 30 may take many different forms beyond the example arrangement of FIG. 2. In particular, the emulator 30 may be adapted to run on the subject processor 12 in order to optimise running of the subject program and thereby deliver an optimised converted program back to the subject processor 12. In other cases, the emulator 30 is arranged to perform a combination of both optimisation and translation. In each situation, it is desired to verify that the emulator 30 correctly performs the program code conversion.

The preferred method and apparatus for verifying correct program code conversion will be described in detail below. However, as background to the present invention, general operation of the example subject and target computing environments 1,2 of FIG. 2 will first be described in more detail.

FIG. 2 shows a subject program in the form of subject code 10. A subject program is usually written in a high-level language that is readily understood by a human programmer (e.g. languages such as C, C++, etc.). The program then is converted from the high-level language into a low-level language (e.g. byte code) more appropriate for control of a computer's processor and related components, such as a memory, an input/output unit, and so on. Finally, in order for the processor to function, the program code is provided in a machine-readable natively executable form (i.e. machine code) that directs primitive operations of the processor, such as loading, shifting, adding and storing operations.

In most cases, natively executable program code that has been produced specifically for one type of processor cannot run on any other type of processor. In particular, each processor has its own specific native instruction set, and there are significant, often fundamental, differences between the instruction sets for different types of processor. There are other differences that lead to non-compatibility, such as whether or not the processor employs a set of condition code flags, and the specific nature and purpose of each condition code flag.

As a general example, some processors are designed for the rapid execution of a sequence of simple instructions, known as a Reduced Instruction Set Computer (RISC). Other processors use an expanded set of instructions each of which represent a sequence of primitive instructions, known as a Complicated Instruction Set Computer (CISC). As a result, natively executable program code for a RISC processor cannot be executed by a CISC processor, and vice versa. As a typical specific example, the subject processor 12 is a CISC processor such as member of the Intel (rtm) x86 family of processors, whilst the target processor 22 is a RISC processor such as member of the PowerPC (rtm) processor family. These two processors are inherently non-compatible. Firstly, these two processors use substantially different instruction sets. Secondly, an x86 processor uses two condition code flags (the auxiliary flag and the parity flag), which are unique to the x86 family and are not provided in the PowerPC architecture.

In most cases, the emulator 30 provides a virtual model of subject processor 12, including key aspects of the processor such as registers and condition code flags. This virtual environment allows the subject program to execute natively on the virtual model of the subject processor, as if the subject code 10 were running natively on a physical example of the subject processor 12.

Figure 3:
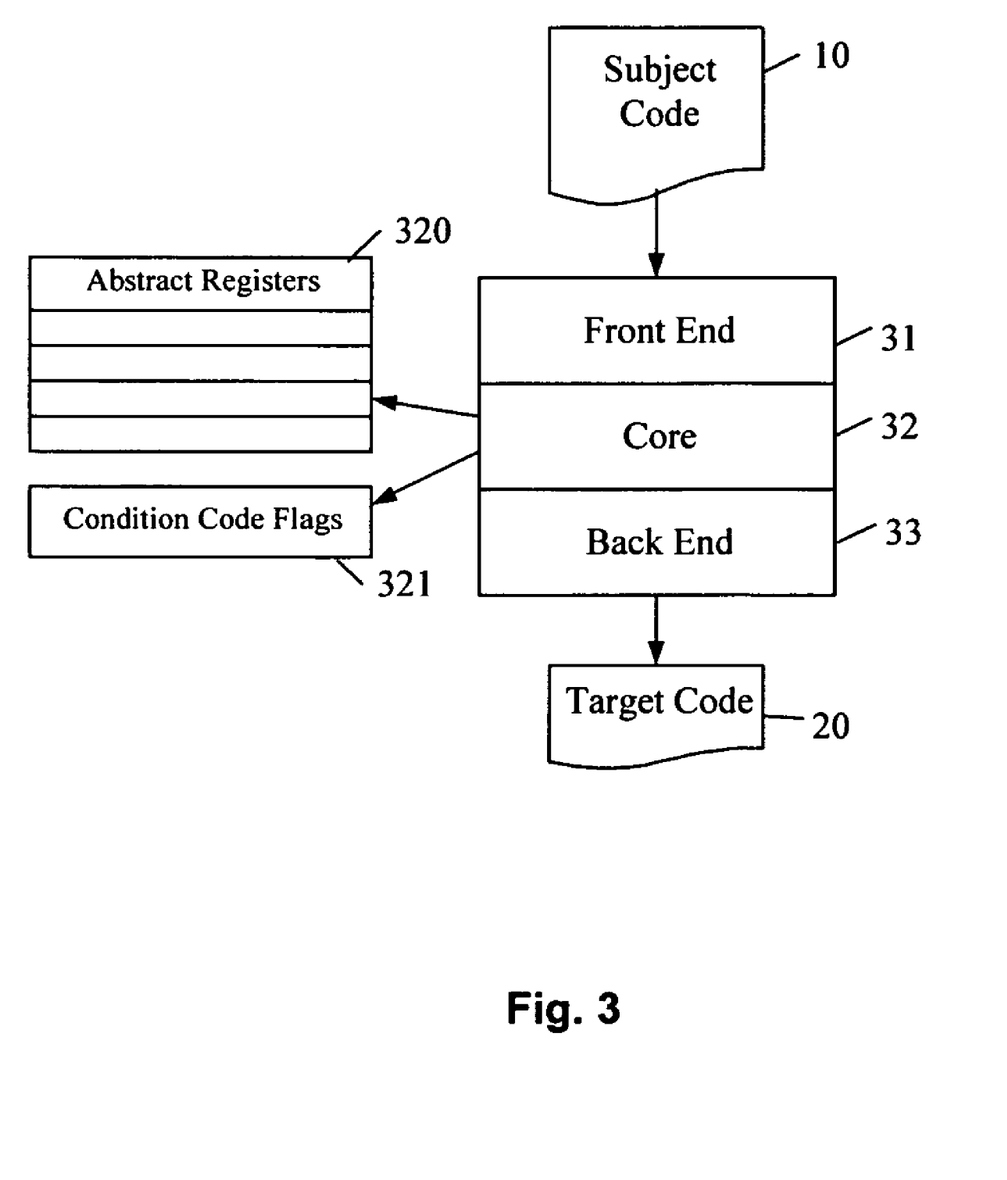
FIG. 3 is a schematic overview of a preferred emulator.

Referring to FIG. 3, the emulator 30 employed in the preferred embodiments of the present invention is illustrated in schematic fashion as possessing the following components: a front end 31, a core 32 and a back end 33, where each of these components are preferably implemented in respective portions of the code representing the emulator 30.

The front end 31 is configured specific to the subject processor 12 being emulated. The front end 31 decodes a predetermined section of the subject code 10 and provides a block of a generic intermediate representation (an "IR block"). An example of intermediate representation generation is described in co-pending U.S. patent application Ser. No. 09/827,971, entitled "Program Code Conversion."

The core 32 optimises each IR block generated by the front end 31 by employing local or global optimisation techniques, such as those optimisation techniques disclosed in co-pending U.S. patent application Ser. No. 10/439,966, entitled "Block Translation Optimization for Program Code Conversion," amongst many other optimisation techniques.

The back end 33 takes optimised IR blocks from the core 32 and produces target code 20 executable by the target processor 22.

Suitably, the front end 31 divides the subject code 10 into basic blocks, where each basic block is a sequential set of instructions between a first instruction at a unique entry point and a last instruction at a unique exit point (such as a jump, call or branch instruction). The core 32 may select a group block comprising two or more basic blocks that are to be treated together as a single unit. Further, the front end 31 may form iso-blocks representing the same basic block of subject code under different entry conditions.

The preferred emulator 30 includes a plurality of abstract registers 320, suitably provided in the core 32, which represent the physical registers 14 that are used within the subject processor 12 to execute the subject code 10. The abstract registers 320 simulate the state of the subject processor 12 being emulated, by representing the expected effects of the subject code instructions on the subject processor registers 14. The emulator 30 optionally emulates other aspects of the subject processor 12, such as the state of condition code flags 321 associated with the registers of the subject processor. In operation, the emulator 30 implicitly records an expected state of the emulated subject processor 12 when executing the subject code 10, such as by using the abstract registers 320 and the emulated condition code flags 321.

In a cross-platform translation mode, the emulator 30 performs program code conversion on the subject code 10 and provides the translated target code 20 to the target processor 22. In the preferred embodiments of the present invention, the emulator 30 performs binary translation, wherein subject code 10 in the form of executable binary code (i.e. machine code) appropriate to the subject processor 12 is translated into target code 20 in the form of executable binary code appropriate to the target processor 22.

Translation can be performed statically, or dynamically. In static translation, an entire program is translated prior to execution of the translated program on the target processor 22. This involves a significant delay. Therefore, the preferred emulator 30 is arranged to dynamically translate small sections of the subject code 10 for execution immediately on the target processor 22. This is much more efficient, because large sections of the subject code 10 will not be used in practice, or will be used only rarely. Therefore, the preferred embodiments of the present invention are particularly intended for use with an emulator 30 that performs dynamic binary translation. However, the invention is not restricted to dynamic binary translation and is applicable generally in the field of program code conversion. For example, embodiments of the present invention are also applicable to an emulator that acts as an interpreter rather than as a compiler.

Figure 4:
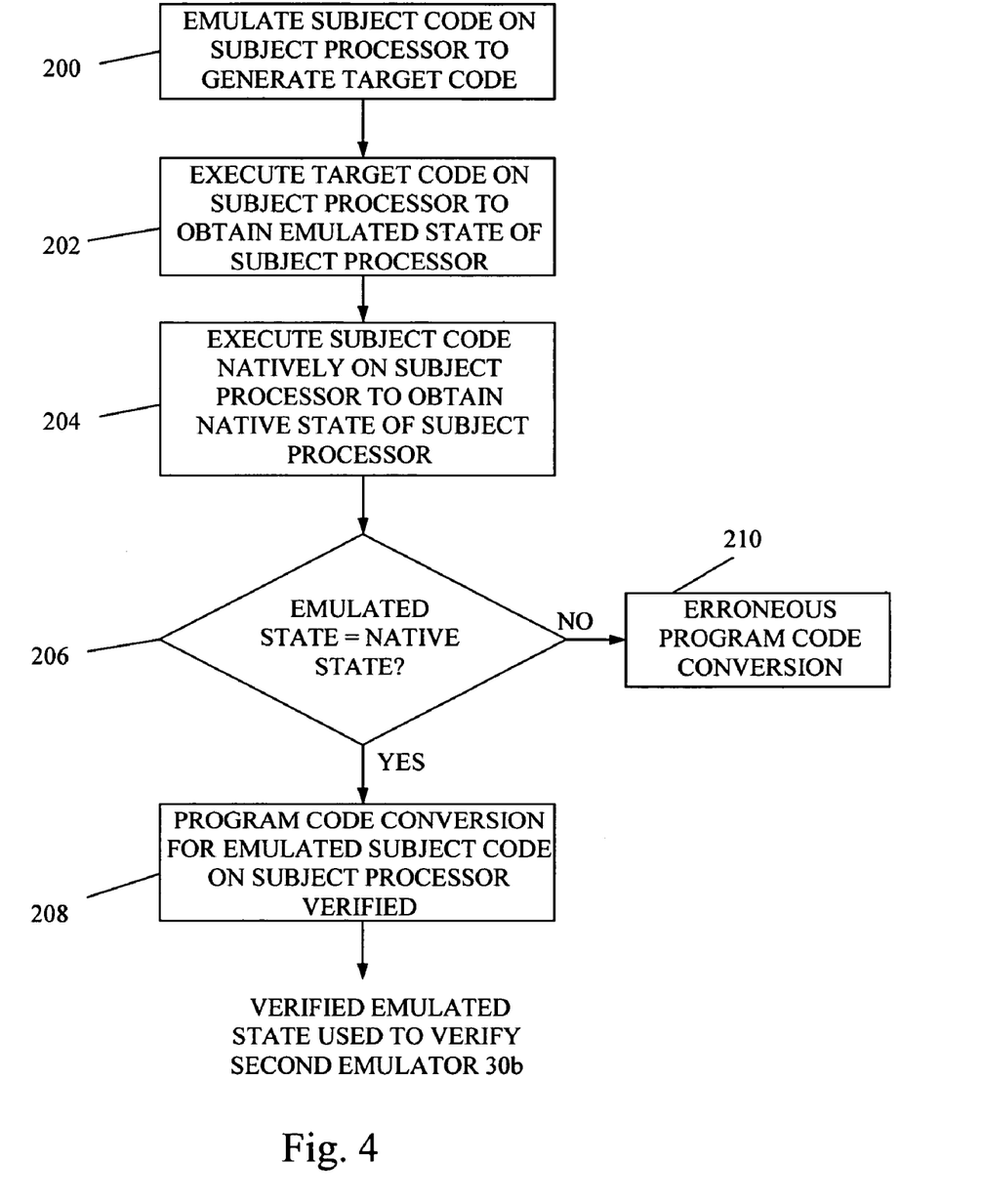
FIG. 4 is an operation flow diagram of the verification of program code conversion performed on the subject processor according to a preferred embodiment.
Figure 5:
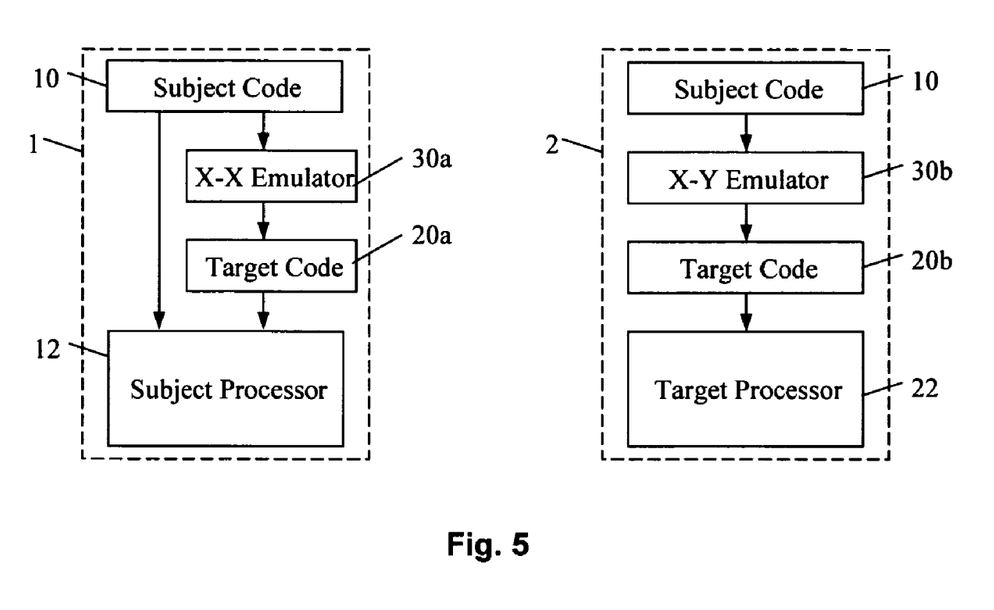
FIG. 5 is a schematic overview of first and second emulators in use according to a preferred embodiment of the present invention.

FIG. 4 is an operation flow diagram of a preferred method of verifying program code conversion, while FIG. 5 is an overview of a preferred apparatus for verifying program code conversion in accordance with the method of FIG. 4.

In the preferred method and apparatus illustrated in FIGS. 4 and 5, a first emulator 30a is used to run the subject code 10 on the subject processor 12. Initially in step 200, the emulator 30a converts the subject code 10 into target code 20a as described above, where the target code 20a is then executed by the subject processor 12 in step 202 to provide an emulated state of the subject processor 12 running the subject code 10. The subject code 10 is then executed natively on the subject processor 12 in step 204 to provide the native state of the subject processor 12 running the subject code 10. Hence, the converted output target code 20a and the original subject code 10 are both executed on the same type of processor. This specific type of emulation can be termed a "same-to-same" or "X-to-X" emulator. Program code conversion performed by the first emulator 30a is verified to be correct, by comparing in step 206 an outcome of running the subject code 10 through the first emulator 30a with an outcome of running the same subject code 10 natively on the subject processor 12. In step 206, the emulated state and the native state of the subject processor 12 are compared against each other at every possible comparable point in the subject code 10, preferably after each instruction in the subject code if possible. If the emulated state and the native state of the subject processor 12 match, then program code conversion for the emulated subject code is verified in step 208. If there is a discrepancy between the emulated state and the native state, then a program code conversion error is identified in step 210. This verification process is a very useful tool, as will be explained in more detail below.

Figure 6:
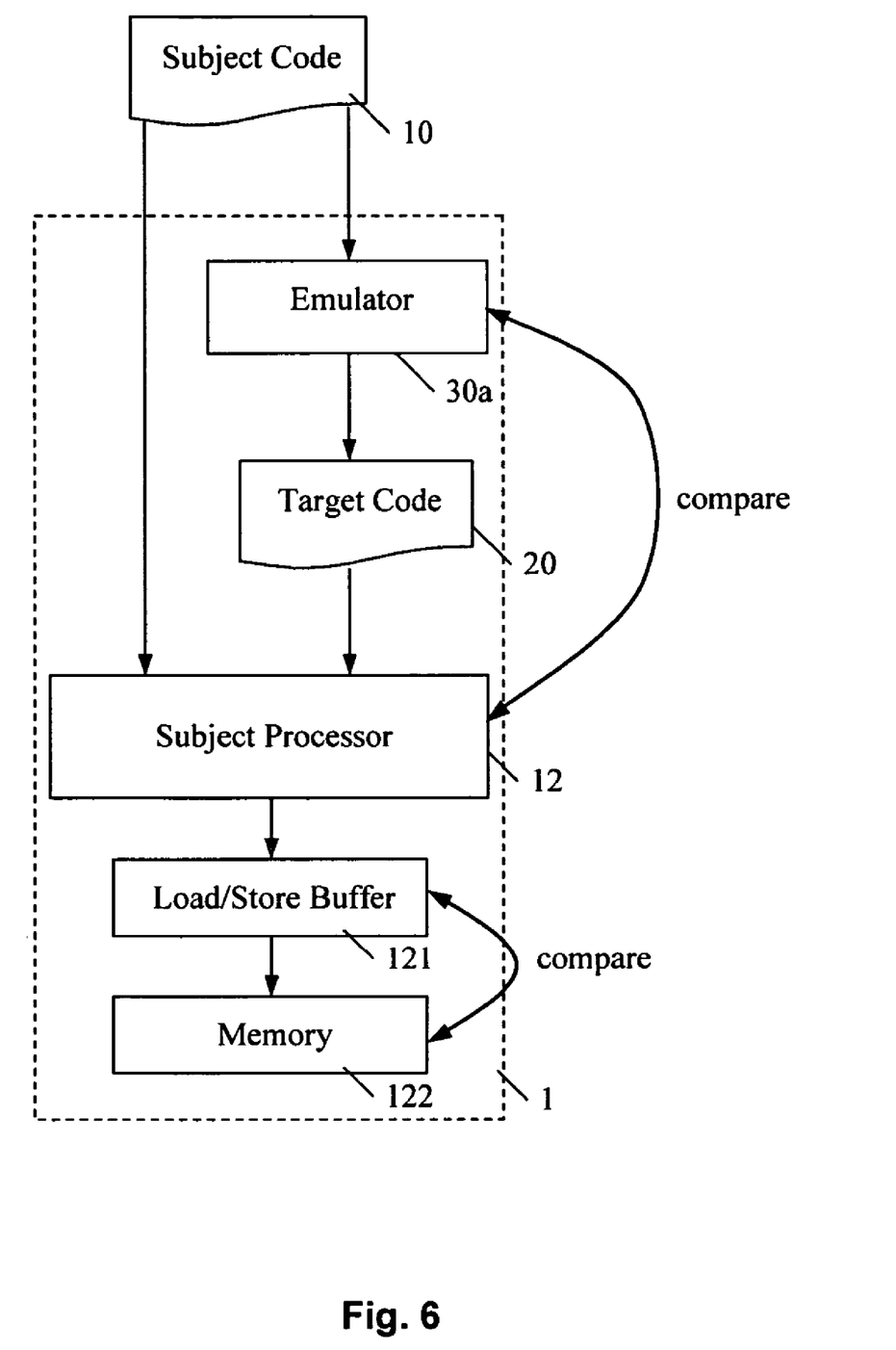
FIG. 6 is a more detailed schematic view showing the first emulator in use according to a preferred embodiment of the present invention.

Referring to FIG. 6, operation of the preferred embodiment of the present invention within the subject environment 1 will now be described in more detail.

In FIG. 6, native execution of the subject code 10 on the subject processor 12 is compared against execution of the same subject code 10 through the emulator 30a. Here, any suitable arrangement can be employed for native execution of the subject code 10. Ideally, the subject code 10 is in the form of machine code and runs directly on the subject processor 12. However, one or more intermediate steps such as compilers or interpreters may be employed, provided that they are trusted to function correctly. The state of the subject environment 1, including in particular the subject processor 12, following this native execution of the subject code 10 forms a native machine state. The native machine state includes the state of the subject processor 12 (i.e., the values contained in the registers 14 and the condition code flags) and the state of the memory 122.

The emulator 30a is arranged to emulate running of the subject code 10 on the subject processor 12. For example, the emulator 30 emulates the effect of the subject code 10 on key elements of the subject processor 12 such as registers 14 and condition code flags. An emulated machine state is provided, derived in particular from this emulated processor model. Hence, the native machine state is comparable against the emulated machine state, to verify the program code conversion performed by the emulator. The emulated machine state is compared against the native machine state at every possible comparable point in the subject code 10, preferably after execution of each instruction in the subject code 10. An incorrect conversion is readily identified by any divergences between the emulated machine state and the native machine state.

In addition to information about the state of the subject processor 12, the native machine state preferably also includes information representing the state of a memory 122 following native execution of the subject code 10. Likewise, the emulated machine state preferably includes an image of the memory 122 following execution of the subject code through the emulator 30a. In the preferred embodiment of the present invention illustrated in FIG. 6, a load/store buffer 121 is provided that operates in conjunction with the processor memory 122. In operation, the load/store buffer 121 handles any memory accesses caused by running of the target code 20a produced by the emulator 30a, without any affect on the memory 122. In this manner, the load/store buffer 121 limits the accessibility of the memory 122 to the emulator 30a. By contrast, when the subject code 10 runs natively in the subject processor 12, full access is provided to the memory 122. As a result, it is possible to compare the real state of the memory 122 against an emulated memory image derived from the state of the load/store buffer 121. Alternatively, the emulated execution of the subject code 10 may be allowed access to the memory 122, whilst the load/store buffer 121 is used to preserve the state of the memory during the native execution.

These comparisons of the processor states and memory states may be performed separately or in combination. Preferably, a first comparison is made between the native and emulated processor states, i.e. between the real state of the processor 12 (the values contained in the registers 14 and the condition code flags) and a virtual model of the processor as held by the emulator 30a (the values contained in the abstract registers 320 and the condition code flags 321). A second comparison is made between native and emulated memory states, i.e. the memory 122 as updated following native execution and the load/store buffer 121 as updated following execution through the emulator 30a. Ideally, a bitwise XOR comparison is performed to demonstrate bitwise compatibility between the native execution of the subject code 10 and the program code conversion performed by the emulator 30a. Bitwise compatibility is preferably demonstrated at the level of each individual instruction in the subject code 10. Here, an efficient comparison scheme may be determined, such as comparing only those parts (e.g. selected registers, or selected memory locations) of the machine states that have been affected by the code executions.

In a particularly preferred embodiment of the present invention, execution of the subject code 10 and execution of the target code 20a share a single process image in the subject processor 12, and therefore work on exactly the same subject code. Advantageously, sharing a single process image minimises performance impact of the verification by allowing a direct comparison to be made quickly and efficiently. Further, due to the synchronous execution of the native and emulated processor states, only a single shared input stream of subject code 10 is required, thus avoiding the complication of recording and playing back a deterministic signal stream. Still further, the synchronous comparison of native and emulated processor states avoids the need for large trace files. However, it is clear that such tightly coupled operation brings problems in achieving the desired isolation between subject code and target code executions. As mentioned above, the load/store buffer 121 selectively isolates the memory 122. Further, context switching is performed in the subject processor to switch between native execution and execution of the emulator.

Figure 7:
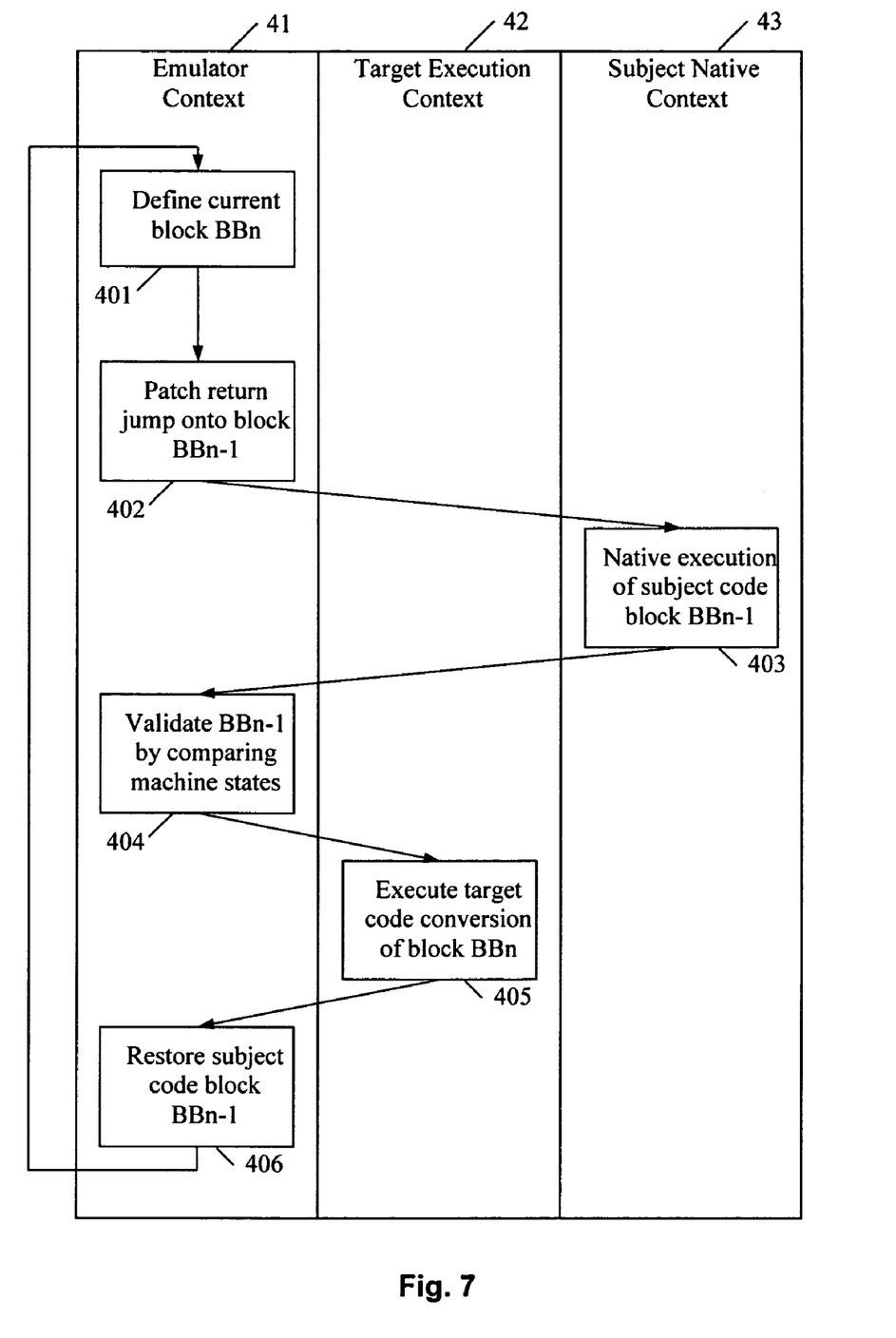
FIG. 7 is a schematic state diagram illustrating a verification method according to a preferred embodiment of the present invention.

FIG. 7 is a state diagram showing major state transitions as the subject processor 12 switches between different contexts, to illustrate the preferred validating method. In FIG. 7, each context is represented by one column, and changes in the control of the subject processor 12 are emphasised by horizontal movement between the columns. In this example, the subject processor 12 has three distinct contexts, namely an emulator context 41 where the emulator 30a runs in the subject processor 12, a target execution context 42 where target code 20a produced by the emulator 30a is executed in the subject processor 12, and a subject native context 43 where the subject code 10 runs natively in the subject processor 12. However, other specific context arrangements are also possible. For example, an emulator 30a that acts as an interpreter would combine the conversion context 41 and the target execution context 42 into a single context.

A preferred embodiment of the program code conversion verification divides a large segment of the subject code 10 into many smaller blocks and performs a verification comparison at each block boundary. In this example, a current block BBn and an immediately preceding block BBn−1 are considered, each block containing one or more instructions from the subject code 10. Each block preferably contains a single instruction in the initial verification stage, where analysis of blocks containing more than one instruction are performed subsequently, as described in more detail below, in order to achieve more complex modes of program code conversion verification.

In step 401, control of the subject processor 12 rests with the emulator 30a in the emulator context 41. The emulator 30a examines the subject code 10 and defines the current block BBn. The emulator 30a then performs program code conversion on the current block BBn to produce a corresponding block of target code 20a. At step 402, the immediately preceding block of subject code BBn−1 is patched with a return jump. A context switch is performed, by executing a context switch routine, into the subject native context 43. At step 403, the preceding block of subject code BBn−1 is executed natively by the subject processor 12, and terminates with the return jump that was patched by the emulator 30a as a native execution harness. The return jump calls the context switch routine, which switches back to the converting context 41. At step 404, the native and emulated machine states are compared, as explained above. At this point, the virtual model of the subject processor held by the emulator 30a should be identical to the real processor 12, with both resting at the end of the preceding block BBn−1. Assuming that the comparison does not indicate an error, another context switch is performed, this time to the target execution context 42. At step 405, the target code 20a corresponding to the current block of subject code BBn is executed in the virtual model of the subject processor held by the emulator, thereby leaving the virtual model and the load/store buffer in a machine state representing the end of the current block BBn. The target code 20a execution then terminates with another context switch back to the emulator context 41. The patched previous block of subject code BBn−1 is restored to its original state at step 406, to minimise intrusive effects of the validating process. The method then returns to the step 401 in order to begin work on the next block BBn+1.

It will be appreciated that each block BBn is first executed through the emulator 30a (as target code in step 405), prior to native execution of that block BBn (in step 403). In the illustrated preferred implementation of the present invention, it is convenient to define a current block BBn in the emulator 30a, before native execution of the immediately preceding block BBn−1 on the subject processor. Here, the virtual model of the subject processor is initially obtained with reference to distributed sources such as physical registers of the host processor (in this case real registers 14 of the subject processor 12), and physical memory locations (including cache and buffer memory locations). Hence, it is preferred to consolidate the virtual model, such as by writing register contents to a predetermined area of memory in an orderly manner, prior to performing the validating comparison. In the preferred implementation, such a consolidated virtual model is more readily available at the beginning, rather than at the end, of each block.

In another preferred embodiment of the present invention, a second emulator 30b is provided in the target computing environment 2 as shown in FIG. 5. The subject code 10 is converted by the second emulator 30b into target code 20b that runs on the target processor 22. That is, a subject program for a first type of processor is converted (e.g. translated or interpreted, with or without optimisation) to produce a converted program for a different type of processor. Here, the emulator is termed a "this-to-that" or "X-to-Y" emulator. The program code conversion performed by the second emulator 30b is verified by comparison against the first emulator 30a. Hence, a chain of trust is established incrementally. Trust is gained initially in the first emulator 30a, and then secondly in the second emulator 30b. This form of incremental validation allows verification to be performed simply and accurately, whilst minimising expense and overheads. This type of arrangement of verifying the program code conversion of a second emulator 30b using an already verified program code conversion of a first emulator 30b designed for a different type of processor will be referred to hereafter as a cross-platform arrangement.

Figure 8:
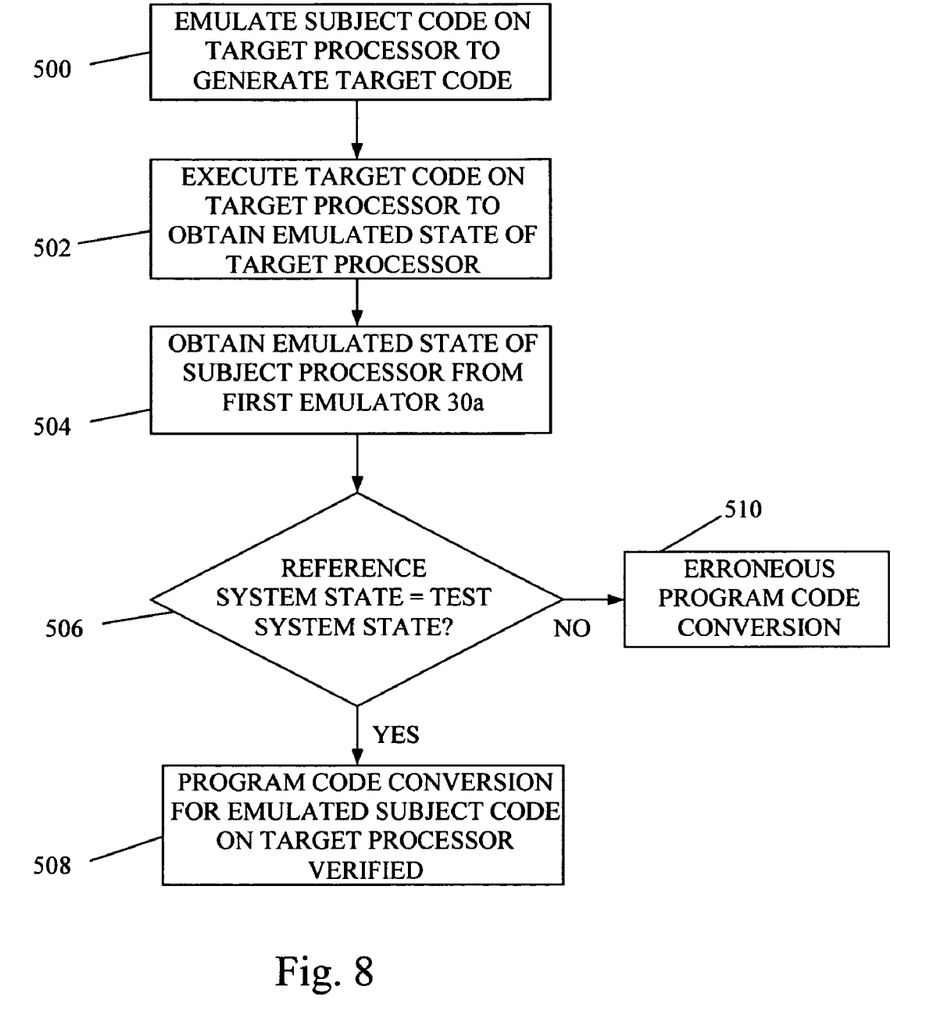
FIG. 8 is an operation flow diagram of the incremental validation of program code conversion performed according to a preferred embodiment.
Figure 9:
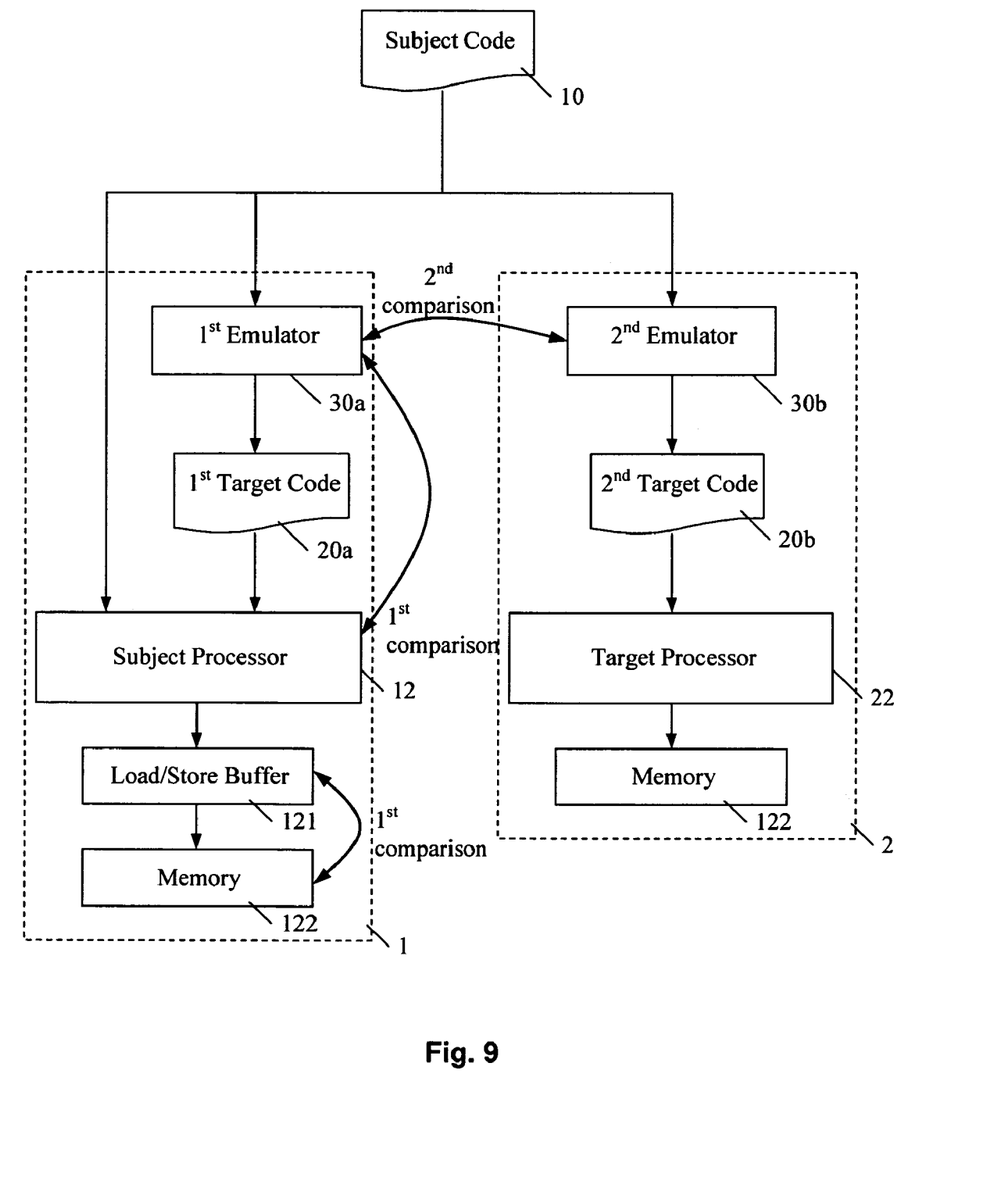
FIG. 9 is a schematic view showing the first emulator and the second emulator in use according to a preferred embodiment of the present invention.

Referring now to FIG. 8, an operational flow diagram of the preferred embodiment of the present invention in a cross-platform arrangement will now be described in more detail, while FIG. 9 is an overview of a preferred apparatus for verifying program code conversion in accordance with the method of FIG. 8.

As shown in the preferred method and apparatus illustrated in FIGS. 8 and 9, the first emulator 30a is provided in the subject environment 1 and performs program code conversion on the subject code 10. As described above with reference to FIGS. 4 and 5, the outcome of running the subject code 10 natively in the subject environment 1 is compared with the outcome of using the first emulator 30a, to confirm that the first emulator 30a is operating correctly. Then, the first emulator 30a is used to verify program code conversion as performed by a second emulator 30b running in the target environment 2. The first emulator 30a is already verified to be operating correctly, and thus the first emulator 30a may be referred to herein below as the "reference system." Meanwhile, it is to be determined whether the second emulator 30b is operating correctly, so the second emulator 30b may be referred to herein below as the "test system."

In operation, the second emulator 30b produces second target code 20b in step 500 that is executed natively on the target processor 22 in step 502. In doing so, the second emulator 30b emulates the effects of the subject code 10 on the emulated subject processor 12. At the same time, the first emulator 30a again emulates the effects of the subject code 10 on the emulated subject processor 12 as already generated in step 202 of FIG. 4. Hence, the outcome as represented by a first emulated state held by the first emulator 30a is obtained in step 504 ("the reference system state"). The reference system state is comparable against the outcome as represented by a second emulated machine state held by the second emulator 30b ("the test system state") in step 506. In step 506, the reference system emulated state and the test system emulated state of the subject processor 12 are compared against each other at every possible comparable point in the subject code 10, preferably after each instruction in the subject code 10 if possible. If the reference system emulated state and the test system emulated states match, then program code conversion for the second emulator 30b is verified in step 508. If there is a discrepancy between the reference system emulated state and the test system emulated state, then a program code conversion error for the second emulator 30b is identified in step 510. Since the first emulator 30a is already trusted to function correctly, the second emulator 30b is now, in turn, verified and trusted to function correctly.

In the various embodiments of the present invention, it is preferred that validation is performed using increasingly complex modes of operation. In a first and simplest mode of operation, a large segment of the subject code 10 is divided into blocks, where each block contains a single instruction. Each single instruction of the subject code runs natively the subject processor 12 and is compared to the first emulator 30a. Correct operation of the first emulator 30a is verified on an instruction-by-instruction basis. Once all of the instructions in the subject code 12 have been executed to establish trustworthy program code conversion, a second more complex mode is engaged wherein the size of each block is increased to include a basic block of several instructions. After the basic blocks of instructions have been validated as described above, the trustworthiness of the program code conversion is verified on an additional level. Then, a third mode is engaged where each block comprises a group of basic blocks (i.e. a group block or an iso-block) which are to be treated together as a single unit, or which represent the same basic block under different conditions. The program code conversion verification method is repeated on the group of basic blocks. Finally, progressively larger segments of subject code are provided where each progressively complex mode of validation adds another level of trustworthiness, until fully trustworthy program code conversion is established.

The same progressively increasingly complex modes of operation are applied when verifying the emulator 30b within the target environment 2, allowing progressively more complex modes of operation from a single instruction through to groups of blocks.

In one embodiment, validation of the first and second emulators 30a, 30b is performed sequentially at different points in time, but this generates a large quantity of data to be recorded in one environment and replayed in the other. Hence, most preferably, validation of the first and second emulators 30a, 30b is performed substantially simultaneously, which avoids a need for onerous playback mechanisms. A block of subject code 10 is supplied to each of the subject processor 12, the first emulator 30a, and the second emulator 30b such that respective machine states, reference system state and test system state, are generated, and the verifying comparisons are performed. Assuming those comparisons are successful, the next block is supplied in turn, until trustworthy program code conversion is verified in both the first emulator 30a and the second emulator 30b.

Figure 10:
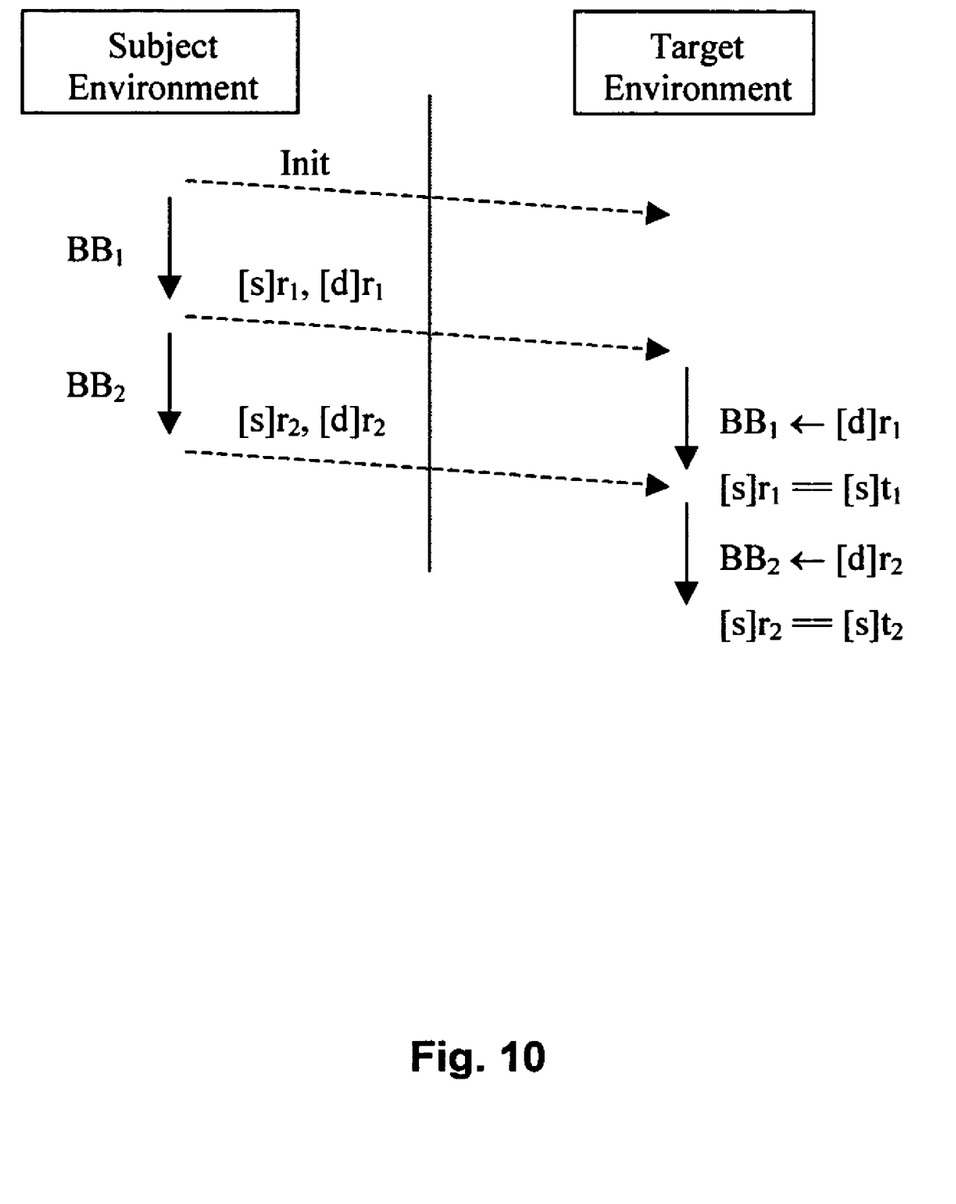
FIG. 10 is a schematic view illustrating synchronisation of the first and second emulators during verification of program code conversion according to a preferred embodiment of the present invention.
Figure 11:
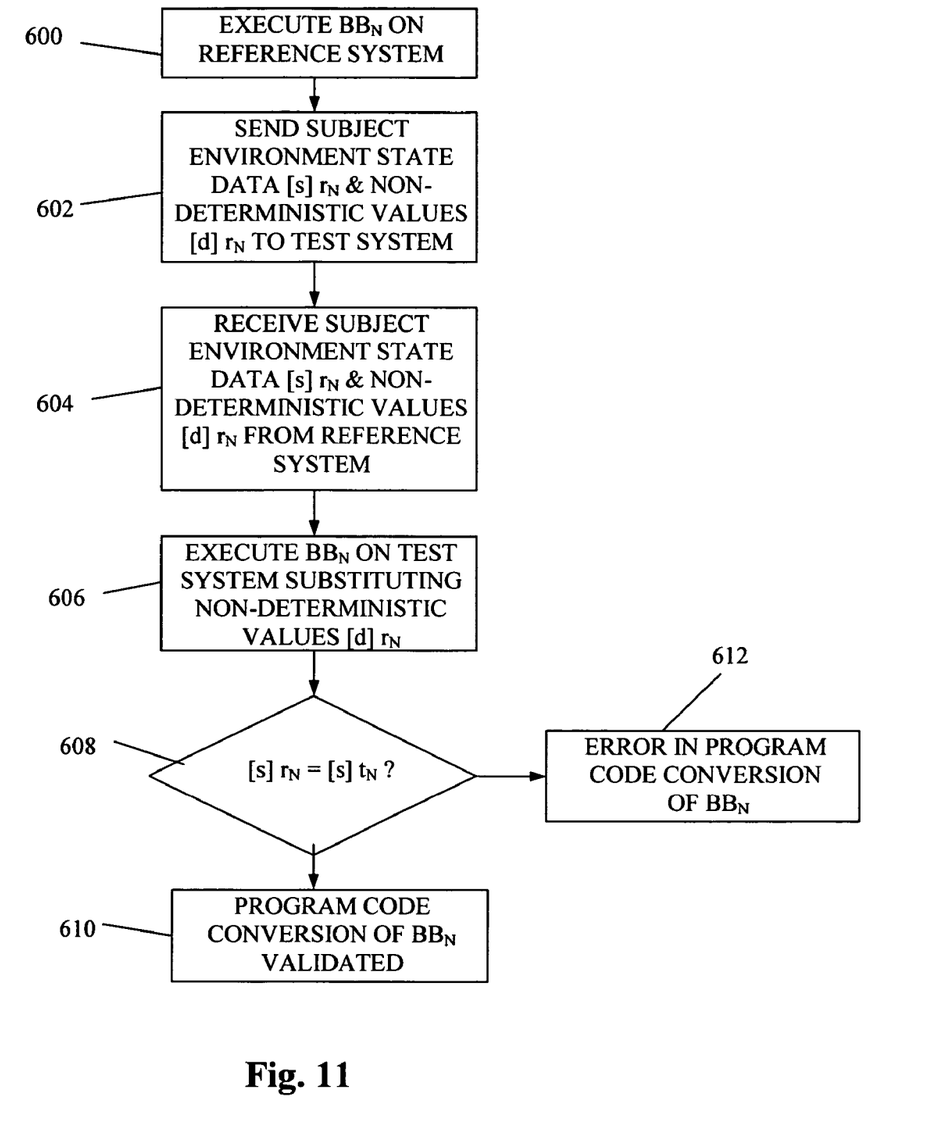
FIG. 11 is an operation flow diagram illustrating synchronisation of the first and second emulators during verification of program code conversion according to a preferred embodiment of the present invention.

FIG. 10 shows a preferred mechanism for synchronising operations in the subject environment 1 with those in the target environment 2. FIG. 11 further shows an operational flow diagram of the method performed in synchronising operations in the subject environment 1 with those in the target environment 2.

As shown in FIG. 10, a communication path is provided from the subject environment 1 to the target environment 2, particularly from the first emulator 30a to the second emulator 30b. This communication path is preferably a single way communication in order to minimise network latency and improve a speed of verification. However, it is understood that the second emulator 30b may be configured in alternative embodiments to communicate bi-directionally, either directly or indirectly, with the first emulator 30a.

Firstly, the two emulators 30a, 30b synchronise their emulated subject machine states, i.e. including emulated registers and memory values, by sending initial state information from the first emulator 30a to the second emulator 30b.

Secondly, synchronisation is maintained by sending non-deterministic values from the subject environment to the target environment. For example, a return value obtained from a system call "get_time_of_day" is recorded in the subject environment 1 and sent to the target environment 2. Hence, the target environment 2 is made to mirror the subject environment 1.

The subject code 10 is divided into a plurality of blocks. For each block of subject code BBN (e.g., one instruction, a block of instructions, a group block, etc.), the subject environment 1 executes that block of code BBN through the first emulator 30a (otherwise referred to as the reference system) in step 600, which results in subject machine state data [s]rn and non-deterministic values [d]rn that are sent in step 602 to the target environment 2 (otherwise referred to as the test system). It is possible to either directly send the subject machine state data [s]rn and non-deterministic values [d]rn to the test system or such information may be stored in a network buffer so that the test system can retrieve this information as needed. Once the test system receives the subject machine state data [s]rn and non-deterministic values [d]rn from the reference system in step 604, then, the second emulator 30b executes the same block BBN of subject code 10 on the test system in step 606 substituting the non-deterministic values [d]rn where appropriate. Following execution of that block of subject code, the received subject machine state data [s]rn from the first emulator 30a is compared with corresponding subject machine state data [s]tn in the second emulator 30b in step 608. If the state data for the reference system and the test system match, then program code conversion for the block BBN of subject code 10 is validated to be correct in step 610. If a divergence is detected, then this is reported as an error in step 612. Otherwise, the process is repeated for the next block of subject code.

The reference system and the test system are preferably executed under control in a synchronous manner. This tightly controlled execution avoids non-deterministic state divergence, thus enabling the comparison of reference system and test system states at any point from instruction level through basic block boundaries up to group block boundaries.

The methods described herein are apt to be recorded as a computer program on a computer readable recording medium. The invention also extends to an emulator apparatus adapted for performing the methods described herein, and to a computer platform when programmed to perform the methods described herein. The program code conversion verification method and apparatus of the present invention also extends to an emulation system, a computing system or a computing platform arranged to perform any of the methods defined herein. The invention may be embodied in any suitable form including, for example, a networked computing system, a server computer, a desktop computer, or a portable computing device. The invention also extends to a computer readable recording medium containing program code instructions for performing any of the methods defined herein.

The present invention has many advantages as will be apparent from the description above, and as will be apparent to the skilled person through practice of the invention. In particular, program code conversion is verified quickly, efficiently, accurately and cost effectively. The preferred embodiments of the invention allow verification across non-compatible subject and target environments to be performed inexpensively and with minimal overhead. Incremental validation first in a subject computing environment and then in the target computing environment minimises impact in each environment. Through incremental validation and by using increasingly complex modes of validation, an emulator can be verified quickly and reliably. The preferred emulator is readily adapted for use with different types of processors, by adapting the front end or the back end of the emulator accordingly. Verification is performed simply and reliably, and can therefore be applied at early stages of development, allowing errors to be detected and resolved quickly and cheaply. The preferred verification allows demonstration of bitwise compatibility at the level of each individual instruction of subject code.

What is claimed:

1. A method of verifying program code conversion performed by an emulator, comprising:
   a) dividing a subject code into a plurality of blocks and executing one of the blocks of subject code through an emulator in a process image on a subject processor according to an emulation context up until a comparable point in the subject code to provide an emulated machine state;
   b) performing a context switch to a native context and executing the same block of subject code natively in the same process image on the same subject processor up until the same comparable point in the subject code to provide a native machine state; and
   c) comparing the native machine state from execution of the one block of subject code natively on the subject processor against the emulated machine state from execution of the same block of subject code on the same subject processor through the emulator at the comparable point in the subject code;
   wherein the native machine state includes a native memory image and the emulated machine state includes an emulated memory image and (a) and/or (b) includes selectively isolating access to a memory associated with the subject processor to obtain the native memory image and/or the emulated memory image, respectively.

2. The method of claim 1, comprising performing (a) prior to performing (b).

3. The method of claim 2, wherein:
   (a) further comprises providing an emulated image of the subject processor;
   (b) further comprises providing a native image of the subject processor following the native execution of the program code; and
   (c) further comprises comparing the emulated image of the subject processor against the native image of the subject processor.

4. The method of claim 3, wherein (a) comprises providing the emulated image of the memory in a load/store buffer associated with the memory, such that the memory is not affected by executing the subject code through the emulator.

5. The method of claim 4, wherein the emulated image of the subject processor includes an image of one or more registers.

6. The method of claim 5, wherein the emulated image of the subject processor includes an image of one or more condition code flags.

7. The method of claim 1, further comprising selectively switching between the emulation context for running the emulator on the subject processor, a target execution context for executing target code produced by the emulator on the subject processor, and the native context where the subject code runs natively in the subject processor.

8. The method of claim 7, wherein both the native context and the emulation context employ a single image of the subject code.

9. The method of claim 1, comprising selecting between two or more verification modes, and dividing the subject code into the plurality of blocks according to the selected verification mode.

10. The method of claim 9, comprising repeating the executing and comparing for each of the plurality of blocks.

11. The method of claim 10, wherein in a first verification mode each block comprises a single instruction of subject code; in a second verification mode each block comprises a basic block comprising a sequence of instructions from a unique entry instruction to a unique exit instruction; and in a third verification mode each block comprises a group block comprising a plurality of the basic blocks.

12. The method of claim 1, comprising:
dividing a large segment of the subject code into a plurality of smaller blocks, each block containing one or more instructions from the large segment of subject code; and
performing a verification comparison at a block boundary between each pair of consecutive neighbouring blocks in the plurality of blocks.

13. The method of claim 12, comprising:
providing the subject processor in the emulation context, where control of the processor rests with the emulator, performing program code conversion on a current block BBn to produce a corresponding block of converted target code, and patching an immediately preceding block of subject code BBn−1 with a return jump;
executing a context switch routine to enter the native context, and executing the immediately preceding block of subject code BBn−1 natively by the subject processor, such that the executing terminates with the return jump;
executing a context switch routine to return to the emulation context, and performing the verification comparison by comparing a native machine state representing the subject processor following execution of the immediately preceding block BBn−1 with an emulated machine state representing a virtual model of the subject processor held by the emulator following execution of the immediately preceding block BBn−1;
executing a context switch to a target execution context, and modelling execution of the target code corresponding to the current block of subject code BBn in the virtual model of the subject processor held by the emulator, thereby leaving the virtual model in a machine state representing the end of the current block BBn; and
repeating the above for each subsequent block in the plurality of blocks, unless the verification comparison reveals an error in the program code conversion.

14. The method of claim 13, further comprising restoring the immediately preceding block BBn−1 to remove the return jump.

15. The method of claim 1, further comprising:
selecting a block of the subject code;
executing the block of subject code on the subject processor through the emulator; and
appending a return jump to the block of subject code, and executing the block of subject code natively on the subject processor terminating with the return jump, such that the return jump returns control of the processor to the emulator.

16. A system of verifying program code conversion performed by an emulator, comprising:
a processor;
a memory, coupled to the processor; and
logic, stored on the memory and executed on the processor, for:
dividing a subject code into a plurality of blocks and executing one of the blocks of subject code through an emulator in a process image on the processor according to an emulation context up until a comparable point in the subject code to provide an emulated machine state;
performing a context switch to a native context and executing the same block of subject code natively in the same process image on the processor up until the same comparable point in the subject code to provide a native machine state; and
comparing the native machine state from execution of the one block of subject code natively on the processor against the emulated machine state from execution of the same block of subject code on the processor through the emulator at the comparable point in the subject code;
wherein the native machine state includes a native memory image and the emulated machine state includes an emulated memory image and the dividing a subject code and/or the performing a context switch includes selectively isolating access to a memory associated with the processor to obtain the native memory image and/or the emulated memory image, respectively.

17. The system of claim 16, wherein:
the logic for dividing the subject code comprises logic for providing an emulated image of the subject processor;
the logic for performing a context switch comprises logic for providing a native image of the subject processor following the native execution of the program code; and
the logic for comparing the native machine state comprises logic for comparing the emulated image of the subject processor against the native image of the subject processor.

18. The system of claim 16, the logic further comprising logic for:
selecting between two or more verification modes, and
dividing the subject code into the plurality of blocks according to the selected verification mode.

19. The system, of claim 18, wherein in a first verification mode each block comprises a single instruction of subject code; in a second verification mode each block comprises a basic block comprising a sequence of instructions from a unique entry instruction to a unique exit instruction; and in a third verification mode each block comprises a group block comprising a plurality of the basic blocks.

20. The system of claim 16, comprising the logic further comprising logic for:
dividing a large segment of the subject code into a plurality of smaller blocks, each block containing one or more instructions from the large segment of subject code; and
performing a verification comparison at a block boundary between each pair of consecutive neighboring blocks in the plurality of blocks.

21. The system of claim 16, the logic further comprising logic for:
selecting a block of the subject code;
executing the block of subject code on the subject processor through the emulator; and
appending a return jump to the block of subject code, and executing the block of subject code natively on the subject processor terminating with the return jump, such that the return jump returns control of the processor to the emulator.

22. A computer programming product of verifying program code conversion performed by an emulator, comprising:
a physical memory; and
logic, stored on the memory for execution on a processor, for:
dividing a subject code into a plurality of blocks and executing one of the blocks of subject code through an emulator in a process image on the processor according to an emulation context up until a comparable point in the subject code to provide an emulated machine state;

performing a context switch to a native context and executing the same block of subject code natively in the same process image on the processor up until the same comparable point in the subject code to provide a native machine state; and comparing the native machine state from execution of the one block of subject code natively on the processor against the emulated machine state from execution of the same block of subject code on the processor through the emulator at the comparable point in the subject code;

wherein the native machine state includes a native memory image and the emulated machine state includes an emulated memory image and the dividing a subject code and/or the performing a context switch includes selectively isolating access to a memory associated with the processor to obtain the native memory image and/or the emulated memory image, respectively.

23. The computer programming product of claim 22, wherein:

the logic for dividing the subject code comprises logic for providing an emulated image of the subject processor;

the logic for performing a context switch comprises logic for providing a native image of the subject processor following the native execution of the program code; and the logic for comparing the native machine state comprises logic for comparing the emulated image of the subject processor against the native image of the subject processor.

24. The computer programming product of claim 22, the logic further comprising logic for:

selecting between two or more verification modes, and dividing the subject code into the plurality of blocks according to the selected verification mode.

25. The computer programming product, of claim 24, wherein in a first verification mode each block comprises a single instruction of subject code; in a second verification mode each block comprises a basic block comprising a sequence of instructions from a unique entry instruction to a unique exit instruction; and in a third verification mode each block comprises a group block comprising a plurality of the basic blocks.

26. The computer programming product of claim 22, comprising the logic further comprising logic for:

dividing a large segment of the subject code into a plurality of smaller blocks, each block containing one or more instructions from the large segment of subject code; and performing a verification comparison at a block boundary between each pair of consecutive neighboring blocks in the plurality of blocks.

27. The computer programming product of claim 22, the logic further comprising logic for:

selecting a block of the subject code;

executing the block of subject code on the subject processor through the emulator; and appending a return jump to the block of subject code, and executing the block of subject code natively on the subject processor terminating with the return jump, such that the return jump returns control of the processor to the emulator.

* * * * *